US011633811B2

(12) United States Patent
Yamaguchi et al.

(10) Patent No.: US 11,633,811 B2
(45) Date of Patent: Apr. 25, 2023

(54) METHOD OF PEENING LAP FILLET WELDED JOINT AND WELDED STRUCTURES

(71) Applicant: JFE STEEL CORPORATION, Tokyo (JP)

(72) Inventors: Naoki Yamaguchi, Tokyo (JP); Tsuyoshi Shiozaki, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 489 days.

(21) Appl. No.: 16/649,661

(22) PCT Filed: Aug. 3, 2018

(86) PCT No.: PCT/JP2018/029310
§ 371 (c)(1),
(2) Date: Mar. 23, 2020

(87) PCT Pub. No.: WO2019/064930
PCT Pub. Date: Apr. 4, 2019

(65) Prior Publication Data
US 2020/0269358 A1    Aug. 27, 2020

(30) Foreign Application Priority Data

Sep. 27, 2017    (JP) .............................. JP2017-186508

(51) Int. Cl.
*B23K 31/00*    (2006.01)
*B23K 9/23*    (2006.01)
(Continued)

(52) U.S. Cl.
CPC ................ *B23K 31/00* (2013.01); *B23K 9/02* (2013.01); *B23K 9/22* (2013.01); *B23K 9/23* (2013.01);
(Continued)

(58) Field of Classification Search
CPC .......... B23K 31/00; B23K 31/10; B23K 9/02; B23K 9/23; B23K 9/00; B23K 9/32;
(Continued)

(56) References Cited

U.S. PATENT DOCUMENTS 6,290,905 B1 * 9/2001 Watanabe .......... B23K 35/3086
420/56
6,932,876 B1    8/2005 Statnikov
(Continued)

FOREIGN PATENT DOCUMENTS

CN    102112268 A    6/2011
CN    102470489 A    5/2012
(Continued)

OTHER PUBLICATIONS

Machine Translation, Morikage, JP 2012-011462A, Jan. 2012. (Year: 2012).*

(Continued)

*Primary Examiner* — Michael E. La Villa
(74) *Attorney, Agent, or Firm* — Kenja IP Law PC

(57) ABSTRACT

A peening method which can sufficiently improve fatigue properties of a lap fillet welded joint having a thin steel sheet as a base sheet, in which a knocking pin having a predetermined shape is continuously knocked as a series of knocking toward a direction inclined relative to the welding direction, the series of knocking is repeatedly performed in the welding direction, at that time, a knocking mark group made of a plurality of knocking marks formed by the series of knocking is superimposed on at least a part of an adjacent knocking mark group while an end part in the direction orthogonal to the welding direction of the knocking mark group is separated from an end part in the direction orthogonal to the welding direction of the adjacent knocking mark group.

12 Claims, 6 Drawing Sheets

(51) Int. Cl.
  *B23K 9/02* (2006.01)
  *C21D 9/50* (2006.01)
  *C21D 7/06* (2006.01)
  *B23K 9/32* (2006.01)
  *B32B 15/01* (2006.01)
  *C21D 7/00* (2006.01)
  *B32B 15/00* (2006.01)
  *B32B 3/02* (2006.01)
  *B23K 9/22* (2006.01)
  *B32B 3/30* (2006.01)
  *B23K 31/10* (2006.01)
  *B23K 101/00* (2006.01)
  *B23K 9/00* (2006.01)

(52) U.S. Cl.
  CPC ............... *B23K 9/232* (2013.01); *B23K 9/32* (2013.01); *B23K 31/10* (2013.01); *B32B 3/02* (2013.01); *B32B 3/30* (2013.01); *B32B 15/00* (2013.01); *B32B 15/011* (2013.01); *C21D 7/00* (2013.01); *C21D 7/06* (2013.01); *C21D 9/50* (2013.01); *B23K 9/00* (2013.01); *B23K 2101/006* (2018.08); *Y10T 428/1241* (2015.01); *Y10T 428/12375* (2015.01); *Y10T 428/12396* (2015.01); *Y10T 428/12958* (2015.01); *Y10T 428/12965* (2015.01); *Y10T 428/12972* (2015.01); *Y10T 428/12993* (2015.01); *Y10T 428/19* (2015.01); *Y10T 428/192* (2015.01); *Y10T 428/195* (2015.01)

(58) Field of Classification Search
  CPC .... B23K 9/22; B23K 9/232; B23K 2101/006; C21D 9/50; C21D 7/06; C21D 7/00; B32B 15/00; B32B 15/011; B32B 3/30; B32B 3/02; Y10T 428/19; Y10T 428/192; Y10T 428/195; Y10T 428/12993; Y10T 428/12958; Y10T 428/12965; Y10T 428/12972; Y10T 428/1241; Y10T 428/12375; Y10T 428/12396
  See application file for complete search history.

(56) References Cited

U.S. PATENT DOCUMENTS

| | | |
|---|---|---|
| 8,776,564 B2 | 7/2014 | Shimanuki et al. |
| 2014/0169863 A1 | 6/2014 | Sharman et al. |

FOREIGN PATENT DOCUMENTS

| | | | |
|---|---|---|---|
| CN | 103596722 | A | 2/2014 |
| CN | 103958116 | A | 7/2014 |
| JP | 3002229 | B2 | 1/2000 |
| JP | 2004098175 | A | 4/2004 |
| JP | 2006167724 | A | 6/2006 |
| JP | 4392337 | B2 | 12/2009 |
| JP | 2010029897 | A | 2/2010 |
| JP | 2011167693 | A | 9/2011 |
| JP | 4837428 | B2 | 12/2011 |
| JP | 2012-011462 | A * | 1/2012 |
| JP | 2013071140 | A | 4/2013 |
| JP | 2013233590 | A | 11/2013 |
| JP | 2014008507 | A | 1/2014 |
| JP | 2017094396 | A | 6/2017 |
| WO | 2011055848 | A1 | 5/2011 |
| WO | 2011092831 | A1 | 8/2011 |
| WO | 2012140920 | A1 | 10/2012 |
| WO | 2012164774 | A1 | 12/2012 |

OTHER PUBLICATIONS

Machine Translation, Morikage, JP 2013-233590, Nov. 2013. (Year: 2013).*

Kenji Takahashi et al., Effect of External Geometry of Reinforcement on the Fatigue Strength of a Walded Joint, Journal of the Japan Welding Society, Aug. 25, 1971, pp. 723-735, vol. 40, Issue 8.

Noboru Egami, Technical Report: Surface Modification by Fine Particle Peening and Its Application—Improvement of Fatigue Properties by FPB treatment, Journal of the Japan Society for Precision Engineering, Sep. 5, 2006, pp. 1071-1074, vol. 72, Issue 9.

Oct. 16, 2018, International Search Report issued in the International Patent Application No. PCT/JP2018/029310.

Mar. 26, 2021, Office Action issued by the China National Intellectual Property Administration in the corresponding Chinese Patent Application No. 201880062670.2 with English language search report.

Oct. 15, 2020, the Extended European Search Report issued by the European Patent Office in the corresponding European Patent Application No. 18862689.9.

* cited by examiner

A-A sectional view

METHOD OF PEENING LAP FILLET WELDED JOINT AND WELDED STRUCTURES

TECHNICAL FIELD

This disclosure relates to a method of peening a lap fillet welded joint having a thin steel sheet as a base sheet and welded structures. In particular, this disclosure has an object of improving the fatigue properties of a lap fillet welded joint.

BACKGROUND

Generally, many suspension parts of automobiles are formed by joining various parts by lap fillet welded joints. Further, since the suspension parts of automobiles are subject to repeated loads during use, it is known that fatigue fracture easily occurs in the joint parts.

Most of fracture modes of fatigue fracture occurring in a lap fillet welded joint is one caused by a crack developed in a direction parallel to a welding direction. This fracture mode is caused by stress in a direction orthogonal to the welding direction. Therefore, the fatigue properties of a lap fillet welded joint are of great significance for suspension parts of automobiles.

Conventional techniques of improving the fatigue properties of a welded joint include a peening method, as illustrated in FIG. 1, comprising knocking a weld toe 4 using a knocking pin 5 to thereby deform the shape of the weld toe 4 and relax stress concentration caused by repeated bending, while applying compressive residual stress by plastic deformation.

In FIG. 1, reference signs 1 and 2 each indicate a thin steel sheet, reference sign 3 indicates a weld metal, and reference sign 6 indicates a knocking pin tip.

As such a peening method, for example, JP 3002229 B (PTL 1) proposes a "method of improving fatigue strength of a weld joint in a welded steel structure by hammer knocking an excess weld toe of the weld joint using a hammer knocking device, in which, knocking is repeated two or three times using a hammer chip with a tip radius of 1.0 mm to 2.8 mm under conditions of a knocking pressure of 3 kg/cm² to 5 kg/cm² and a hammer knocking angle of 30 degrees to 50 degrees, thereby applying to the surface of the excess weld toe a compressive residual stress equivalent to the yielding point of a base sheet".

JP 2014-008507 A (PTL 2) proposes a "method comprising applying knocking power to a base end of a knocking pin by an air-driven part and peening a weld portion with a tip of the knocking pin, in which the curvature radius of the knocking pin tip is adjusted to 1.5 mm to 3.0 mm, and a knocking mark having a curvature radius of 1.5 mm to 3.0 mm and a depth of 0.5 mm or less in a cross section perpendicular to a welding direction is formed at least in a weld toe".

However, in the techniques of PTL 1 and PTL 2, knocking is performed by merely moving a knocking pin (hammer) along a weld toe toward a welding direction, and thus, a fold mark 7 at the weld toe is formed by plastic flow as illustrated in FIG. 2 and a fatigue fracture occurs originating from the fold mark 7 at the weld toe, and as a result, the fatigue properties are not sufficiently improved.

In FIG. 2, reference sign 8 indicates a fold mark at a knocking mark edge.

JP 4837428 B (PTL 3) proposes a "method of subjecting a weld toe to ultrasonic impact processing, comprising imparting ultrasonic vibration to a pin provided at a tip part and imparting ultrasonic impact to a weld toe using the pin, in which the curvature radius of the tip part of the pin is 1.0 mm or more and 2.0 mm or less, and a recessed shape with a curvature radius of 1.5 mm or more and less than 2.5 mm is formed in a cross section perpendicular to a welding direction of the weld toe".

Further, J P 2013-071140 A (PTL 4) proposes a "welded joint having excellent fatigue resistance comprising a weld toe subjected to peening, in which the radius ρ (mm) and the flank angle θ (°) of the weld toe before the peening and the curvature radius r (mm) of a tip part of a vibration terminal used in the peening satisfy the following formulas (1) and (2) and a fold mark is not formed at the weld toe after the peening by plastic processing during peening $$\rho/\theta \geq r/100 \tag{1}$$

$$2 \leq r \leq 10 \tag{2}$$

where ρ indicates the radius (mm) of the weld toe before the peening, θ indicates the flank angle (°) of the weld toe before the peening, and r indicates the curvature radius (mm) of the tip part of the vibration terminal used in the peening".

In addition, JP 4392337 B (PTL 5) proposes a "processing method using a ultrasonic impact device for subjecting a material surface to ultrasonic impact processing to improve residual stress, the ultrasonic impact device having a plurality of pins for giving ultrasonic impact to the material surface, the pins being arranged in a line, the method comprising subjecting the material surface to ultrasonic impact processing by scanning the pins in a direction inclined relative to the arrangement direction of the pins, in which an angle formed by the arrangement direction of the pins and the scanning direction of the pins is an angle at which an edge generated by swelling on the material surface as a result of impacting a single pin is overlapped with an edge generated by swelling on the material surface as a result of impacting an adjacent pin, the plurality of pins are scanned on the material surface in a direction orthogonal to the direction in which attempts are made to improve the residual stress to thereby form a plurality of processed bands by ultrasonic impact processing, and the processed bands have three or more edges at least in a direction orthogonal to the processed bands".

CITATION LIST

Patent Literatures

PTL 1: JP 3002229 B
PTL 2: JP 2014-008507 A
PTL 3: JP 4837428 B
PTL 4: JP 2013-071140 A
PTL 5: JP 4392337 B

Non-Patent Literatures

NPL 1: Improvement of Fatigue Properties by FPB Treatment, Journal of the Japan Society for Precision Engineering, Vol. 72, No. 9 (2006), pp. 1071-1074
NPL 2: Effect of External Geometry of Reinforcement on the Fatigue Strength of a Welded Joint, Journal of the Japan Welding Society, Vol. 40 (1971), No. 8, pp. 723-735

SUMMARY

Technical Problem

However, when the method of PTL 3 is applied to a lap fillet welded joint having, as a base sheet, a steel sheet with a small thickness, in particular, a thin steel sheet having a thickness of 3.5 mm or less, a fold mark at a weld toe is formed and thus fatigue properties cannot be sufficiently improved.

Further, in the method of PTL 4, the curvature radius of a tip of a vibration terminal (knocking pin) and the radius and the flank angle of a weld toe before peening are adjusted based on the predetermined relational expression. Based on the relational expression, for example, when the curvature radius of the weld toe before peening is 0.3 mm, the flank angle of the weld toe needs to be 15° or less. Further, the flank angle of the weld toe is typically about 60°, and thus the method of PTL 4 cannot be applied to most welded joints in actual construction.

Moreover, when the curvature radius of a tip of a knocking pin is increased as in PTL 3 and PTL 4, a higher driving force is required to apply pressure necessary for producing plastic deformation, and thus, when a base sheet is a high-strength steel sheet, an expensive and large device such as air-driven type and ultrasonic type needs to be used. On the other hand, when the stiffness of a base sheet is low, the base sheet would be deformed.

In addition, the method of PTL 5 can neither sufficiently suppress crack development caused by stress in a direction orthogonal to a welding direction, nor produce a sufficient effect of improving fatigue properties of a lap fillet welded joint.

Although NPL 1 proposes a surface modification treatment method (fine-particle bombardment processing method (FPB treatment method)) comprising subjecting the material to plastic deformation by bombarding fine particles with a diameter of 50 µm to 100 µm to a material to be treated, the method requires a large device and a splattering preventing device for the fine particles, and it is difficult in the method to apply local processing to a complicated structure such as a weld toe of a fillet welded joint.

It could thus be helpful to provide a peening method which can sufficiently improve fatigue properties of a lap fillet welded joint having a thin steel sheet as a base sheet by this disclosure.

It could also be helpful to provide a welded structure obtained by the peening method.

Solution to Problem

It has been conventionally believed that when a weld toe has a curvature radius of 1.0 mm or less, stress concentration cannot be sufficiently relaxed and thus, to sufficiently obtain an effect of relieving stress concentration, it is necessary to increase, to some degree, the curvature radius in a vertical cross section in a direction orthogonal to a welding direction of a tip of a knocking pin (hereinafter, also referred to as "curvature radius of a knocking pin tip").

The inventors made intensive studies to solve the above problems and discovered the following.
(1) At a weld toe, stress remains due to cooling after the welding and fine asperities (hereinafter, also referred to as "weld ripples") 9 having a diameter of 0.05 mm or less as illustrated in FIG. 3 occur, and the stress and fine asperities are factors that deteriorate the fatigue properties, in particular, in a welded joint having a high-strength steel sheet having a tensile strength of 780 MPa or more as a base sheet.
(2) In this regard, when peening is performed to apply compressive stress to a weld toe through plastic deformation and make weld ripples collapsed to be flattened, stress concentration is relaxed even with a reduced curvature radius of a knocking pin tip.
(3) In particular, when the curvature radius of a knocking pin tip is made smaller than that of a weld toe, it is possible to effectively prevent the occurrence of the fold mark 7 at the weld toe illustrated in FIG. 2.

However, it was not possible to obtain a sufficient fatigue property improving effect by merely making the curvature radius of a knocking pin tip smaller than that of a weld toe.

The inventors thus made further studies and discovered the following.
(4) The fold mark 8 at a knocking mark edge illustrated in FIG. 2 may provide the origin of fatigue fracture. In particular, as illustrated in FIG. 4, when a lap fillet welded joint is continuously knocked along a weld toe in a welding direction, fold marks 8 at knocking mark edges are continuously connected in a direction orthogonal to a stress loading direction, that is, the welding direction, and as a result, the stress intensity factor is increased to promote development of a crack, deteriorating fatigue properties (in FIG. 4, reference sign 10 indicates a knocking mark and reference sign 11 indicates a weld bead).
(5) To prevent the deterioration of fatigue properties, it is effective to prevent fold marks 8 at knocking mark edges from being continuously connected in the welding direction.
(6) Specifically, the following process (a) or (b) is effective.
(a) A knocking pin is continuously knocked as a series of knocking toward a direction inclined relative to a welding direction across a weld toe and the series of knocking is repeatedly performed in the welding direction. At that time, knocking mark groups 12, each being made of a plurality of knocking marks 10 as illustrated in FIG. 5, are formed by superimposing a knocking mark group made of a plurality of knocking marks formed by the series of knocking on at least a part of an adjacent knocking mark group while separating an end part 121 of the knocking mark group in a direction orthogonal to the welding direction from an end part 121 of the adjacent knocking mark group in a direction orthogonal to the welding direction.
(b) A knocking pin is knocked while the knocking pin is oscillated with a fixed width to a direction orthogonal to a welding direction across a weld toe and moved in the welding direction to thereby form a knocking region 13 having a plurality of knocking marks 10 as illustrated in FIG. 6. In the knocking region 13, end parts 101 of knocking marks 10 that are located in an end part along a width direction of the knocking region 13 and superimposed on each other, are separated from each other in the direction orthogonal to the welding direction, or knocking marks 10 that are located at the widthwise edge of the knocking region 13 are connected to one another in the welding direction at three knock points or less.
(7) The fatigue properties of a lap fillet welded joint having a thin steel sheet as a base sheet can be significantly improved by any of the processes (a) and (b) stated above without deformation such as curl of the base sheet.

Further, the inventors made intensive studies and found that when the knocking pin 5 having a tip with a relatively small radius as in this disclosure is used, the contact area between the weld toe 4 as a knocked part and a knocking pin tip 6 is decreased, and as a result, the knocking load of the knocking pin 5 may be small for ensuring proper knocking pressure.

On the other hand, however, the inventors discovered that as illustrated in FIG. 8, when a knocking tool 17 having the knocking pin 5 on its tip is fixed with a knocking tool holder 18 and pressed against the weld toe 4, if the pressing load surpasses the knocking load of the knocking pin 5, the knocking pin tip 6 and the weld toe 4 are brought into close contact with each other, and the knocking effect cannot be obtained.

Then, the inventors made intensive studies to solve the problem, and as a result, found that when the knocking tool 17 is fixed with the knocking tool holder 18, the knocking tool 17 is clamped with a viscoelastic material 20 as illustrated in FIG. 9 to thereby cause inconsistence between the vibration of the knocking tool holder 18 and that of the knocking pin 5, and then the weld toe 4 and the knocking pin tip 6 are not brought into close contact with each other even if the pressing load is high, and a sufficient knocking effect can be obtained.

This disclosure is based on the aforementioned discoveries and further studies.

Specifically, we provide the following.

1. A method of peening a lap fillet welded joint, comprising knocking a weld toe of the lap fillet welded joint using a knocking pin attached to a tip of a knocking tool, wherein
the knocking pin has, on its tip, a curvature radius in a vertical cross section in a direction orthogonal to a welding direction of 0.05 mm to 0.50 mm and equal to or less than a curvature radius of the weld toe,
the knocking pin is continuously knocked as a series of knocking toward a direction inclined relative to the welding direction across the weld toe,
the series of knocking is repeatedly performed in the welding direction,
at that time, a knocking mark group made of a plurality of knocking marks formed by the series of knocking is superimposed on at least a part of an adjacent knocking mark group while an end part in the direction orthogonal to the welding direction of the knocking mark group is separated from an end part in the direction orthogonal to the welding direction of the adjacent knocking mark group.

2. The method of peening a lap fillet welded joint according to 1., wherein the series of knocking is performed at an inclination angle relative to the welding direction of 30° to 45°.

3. The peening method according to 1. or 2., wherein the knocking tool is clamped with a viscoelastic material on a holder of the knocking tool.

4. A welded structure having a lap fillet welded joint,
comprising a plurality of knocking mark groups in which a plurality knocking marks run at an angle relative to a welding direction across a weld toe of the lap fillet welded joint, wherein
the knocking marks have a curvature radius in a cross section perpendicular to the weld line direction of 0.05 mm to 0.50 mm, and
each knocking mark group is superimposed on at least a part of an adjacent knocking mark group while an end part in a direction orthogonal to a welding direction of the knocking mark group is separated from an end part in the direction orthogonal to the welding direction of the adjacent knocking mark group.

5. The welded structure according to 4., wherein each knocking mark group has the knocking marks running at a slanting angle of 30° to 45° with respect to the welding direction.

6. The welded structure according to 4. or 5., wherein the lap fillet welded joint has a base sheet with a tensile strength of 780 MPa or more.

7. A method of peening a lap fillet welded joint, comprising knocking a weld toe of the lap fillet welded joint using a knocking pin attached to a tip of a knocking tool, wherein
the knocking pin has, on its tip, a curvature radius in a vertical cross section in a direction orthogonal to a welding direction of 0.05 mm to 0.50 mm and equal to or less than a curvature radius of the weld toe,
the knocking pin is knocked while the knocking pin is oscillated in the direction orthogonal to the welding direction across the weld toe and moved in the welding direction,
the knocking pin has an oscillation width around the weld toe at least twice a width of a knocking mark per knock point, and in a knocking region determined according to the oscillation width of the knocking pin, end parts of knocking marks that are located in an end part along a width direction of the knocking region and superimposed on each other, are separated from each other in the direction orthogonal to the welding direction, or knocking marks located in an end part along the width direction of the knocking region are contacted with each other in the welding direction at three knock points or less.

8. The peening method according to 7., wherein the knocking tool is clamped with a viscoelastic material on a holder of the knocking tool.

9. A welded structure having a lap fillet welded joint,
comprising a knocking region having a plurality of knocking marks running across a weld toe of the lap fillet welded joint, wherein
in the knocking region,
the knocking marks have a total length on the weld toe of 50% or more of the whole length of the weld toe, and
the knocking region has a width at least twice a width of a knocking mark per knock point,
and further, in the knocking region, end parts of knocking marks that are located in an end part along a width direction of the knocking region and superimposed on each other, are separated from each other in a direction orthogonal to a welding direction, or knocking marks located in an end part along the width direction of the knocking region are contacted with each other in the welding direction at three knock points or less.

10. The welded structure according to 9., wherein the lap fillet welded joint has a base sheet with a tensile strength of 780 MPa or more.

Advantageous Effect

According to this disclosure, it is possible to significantly improve fatigue properties of a lap fillet welded joint having a thin steel sheet as a base material.

Further, since a smaller tool can be used as compared with air-driven type and ultrasonic type tools, peening is available at a position where peening could not be performed due to posture and weight constraints imposed by a large tool, and workability and productivity are also improved. Moreover, as to a welded structure having low stiffness which could not be subjected to peening due to the possibility of deformation, fatigue properties can be significantly improved without deformation such as curl of a base sheet. In addition, pre-treatment using a grinder or the like proposed in claim 2 of PTL 4 is not required, which fact also improves workability and productivity.

Further, when the welded structure of this disclosure is applied to, for example, automotive parts, high-strength steel sheets are applicable to automotive parts requiring excellent fatigue properties, and through this point it becomes possible to improve the fuel consumption of automobiles.

DETAILED DESCRIPTION

Figure 1:
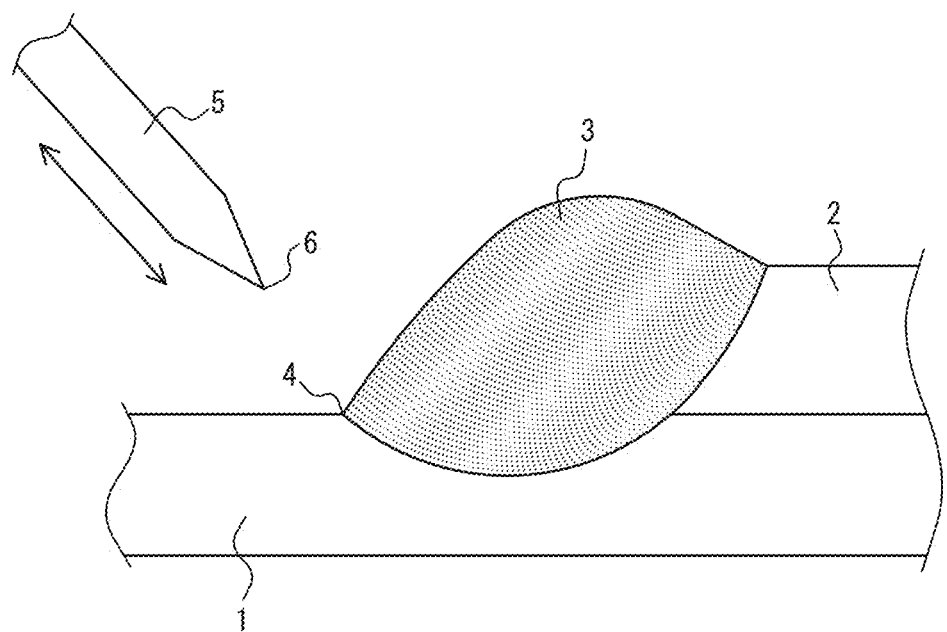
FIG. 1 is a schematic diagram illustrating one typical example of peening.

The present disclosure is described in detail below based on embodiments.

First Embodiment

A method of peening a lap fillet welded joint according to a first embodiment, comprises knocking a weld toe 4 of the lap fillet welded joint using a knocking pin 5 attached to a tip of a knocking tool, wherein the knocking pin 5 has, on its tip, a curvature radius in a vertical cross section in a direction orthogonal to a welding direction of 0.05 mm to 0.50 mm and equal to or less than a curvature radius of the weld toe 4, the knocking pin 5 is continuously knocked as a series of knocking toward a direction inclined relative to the welding direction across the weld toe 4, the series of knocking is repeatedly performed in the welding direction, and at that time, a knocking mark group 12 made of a plurality of knocking marks 10 formed by the series of knocking is superimposed on at least a part of an adjacent knocking mark group 12 while an end part 121 in a direction orthogonal to the welding direction of the knocking mark group 12 is separated from an end part 121 of the adjacent knocking mark group 12 in a direction orthogonal to the welding direction.

The method of peening a lap fillet welded joint according to the first embodiment is described below.

A curvature radius of the knocking pin tip 6 being 0.05 mm to 0.50 mm and equal to or less than a curvature radius of the weld toe 4

As stated above, when weld ripples 9 formed on the weld toe 4 during welding are collapsed to be flattened, stress concentration is relaxed even if the curvature radius of the knocking pin tip 6 is decreased, and a fold mark 7 at the weld toe can be effectively prevented from occurring. Therefore, the curvature radius of the knocking pin tip 6 is set to 0.50 mm or less and equal to or less than the curvature radius of the weld toe 4 of the welded joint before peening. Further, from the viewpoint of effectively collapsing the weld ripples 9, the curvature radius of the knocking pin tip 6 needs to be set to 0.05 mm or more.

For example, in the case of a lap fillet welded joint having a thin steel sheet with a thickness of 3.6 mm or less as a base sheet, the curvature radius of the weld toe 4 is typically about 0.50 mm to 1.0 mm, and thus the knocking pin tip 6 having a curvature radius of 0.05 mm to 0.50 mm is used.

Further, in the method of peening a lap fillet welded joint according to the first embodiment, it is important that the knocking pin 5 is continuously knocked as a series of knocking toward a direction inclined relative to the welding direction across the weld toe 4, the series of knocking is repeatedly performed in the welding direction, and at that time, a knocking mark group 12 made of a plurality of knocking marks 10 formed by the series of knocking is superimposed on at least a part of an adjacent knocking mark group 12 while an end part 121 in a direction orthogonal to the welding direction of the knocking mark group 12 is separated from an end part 121 of the adjacent knocking mark group 12 in a direction orthogonal to the welding direction.

Figure 5:
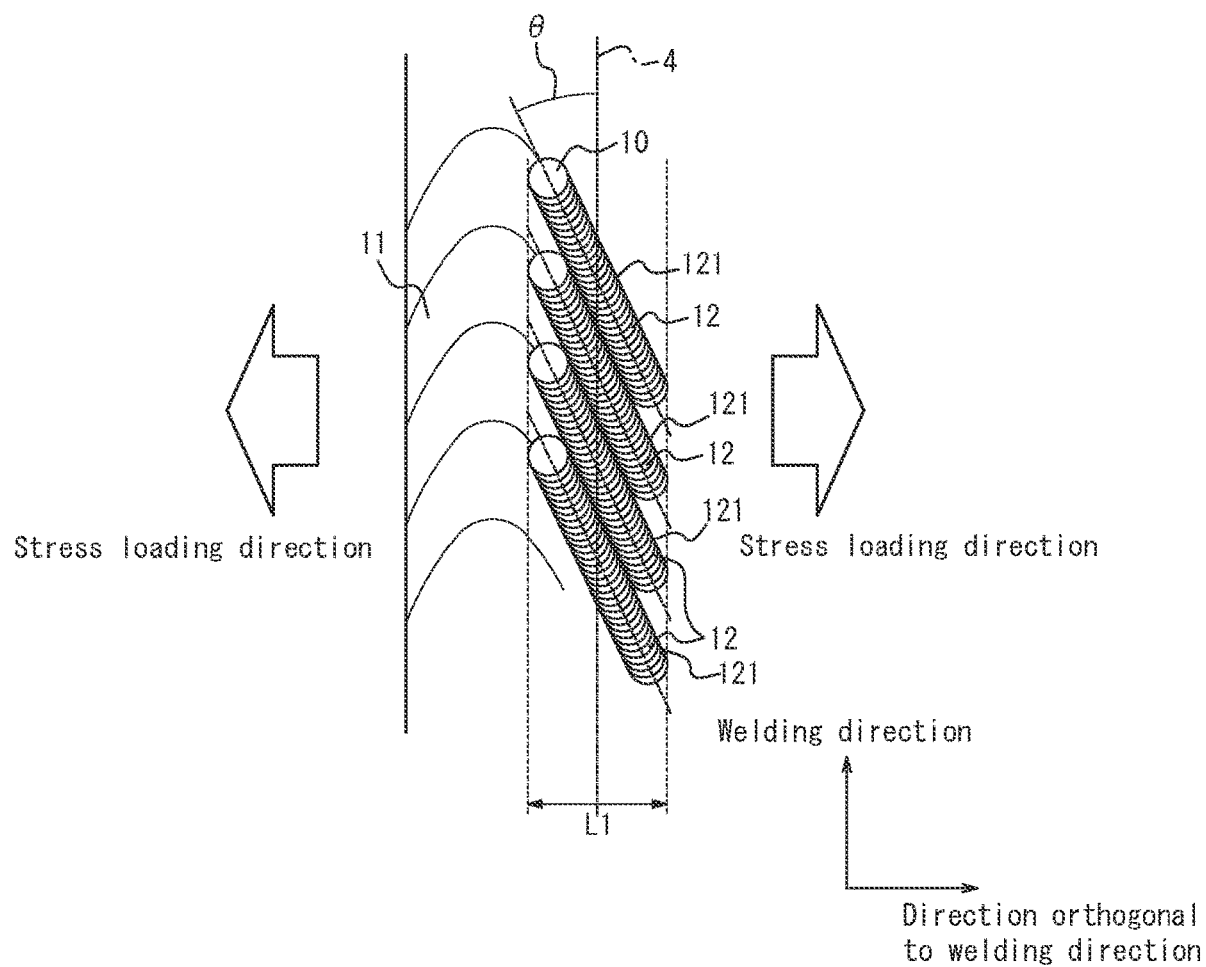
FIG. 5 is a schematic diagram illustrating a knocking mark (knocking mark group) formed by a peening method according to one of the disclosed embodiments and a stress loading direction of a representative fatigue fracture mode.

As used herein, the knocking mark group 12 refers to a series of knocking marks 10 running at a predetermined inclination angle relative to the welding direction as illustrated in FIG. 5.

Further, the end part 121 of the knocking mark group 12 in a direction orthogonal to the welding direction refers to a region ranging from the end of the knocking mark group 12 in a direction orthogonal to the welding direction to 1% of the width of the knocking mark group 12.

Figure 2:
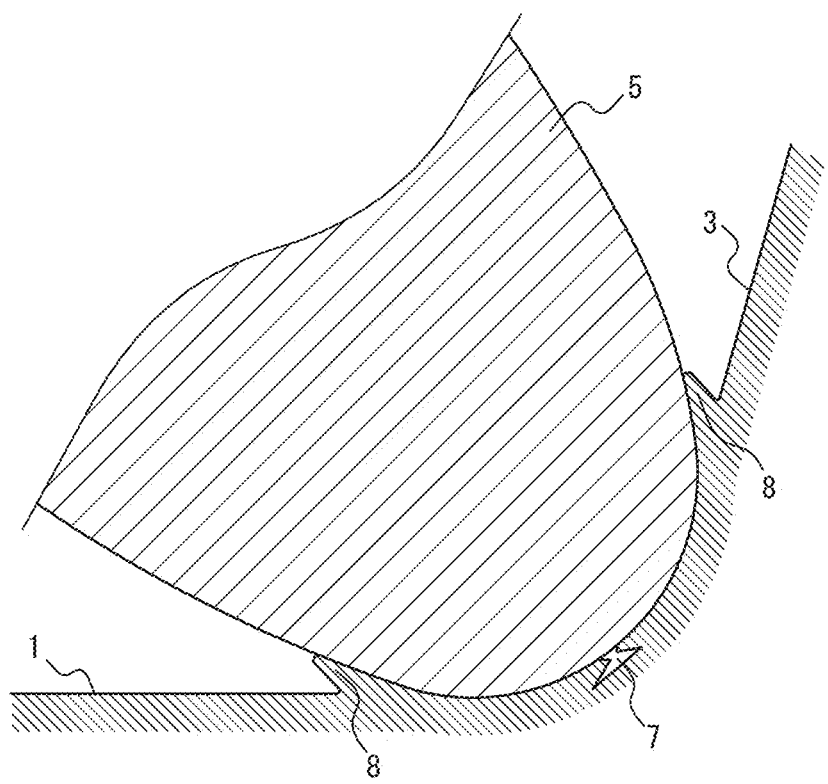
FIG. 2 is a schematic diagram illustrating one example of a fold mark formed during peening.
Figure 3:
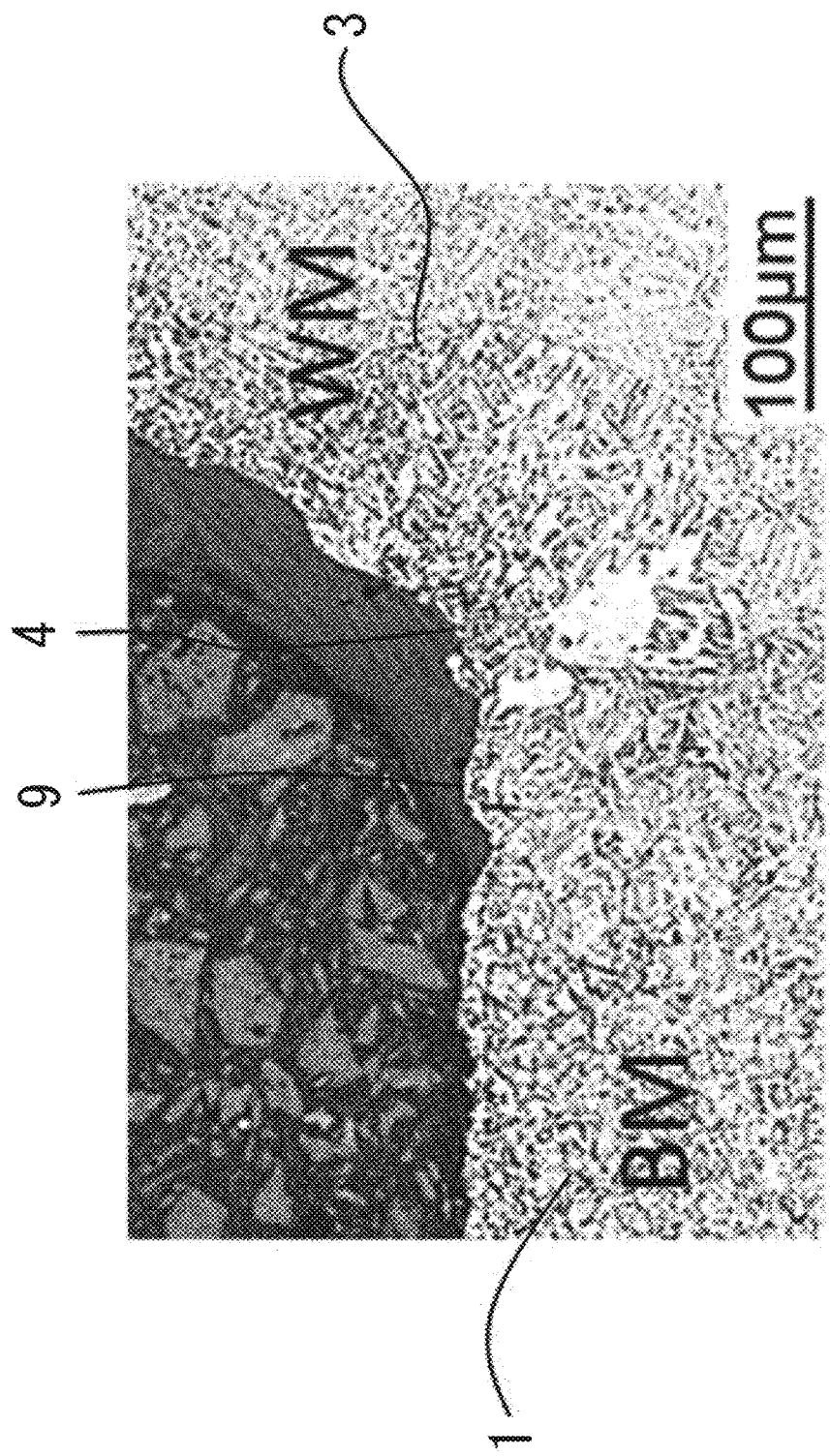
FIG. 3 is a micro-image illustrating one example of a weld toe of a lap fillet welded joint.
Figure 4:
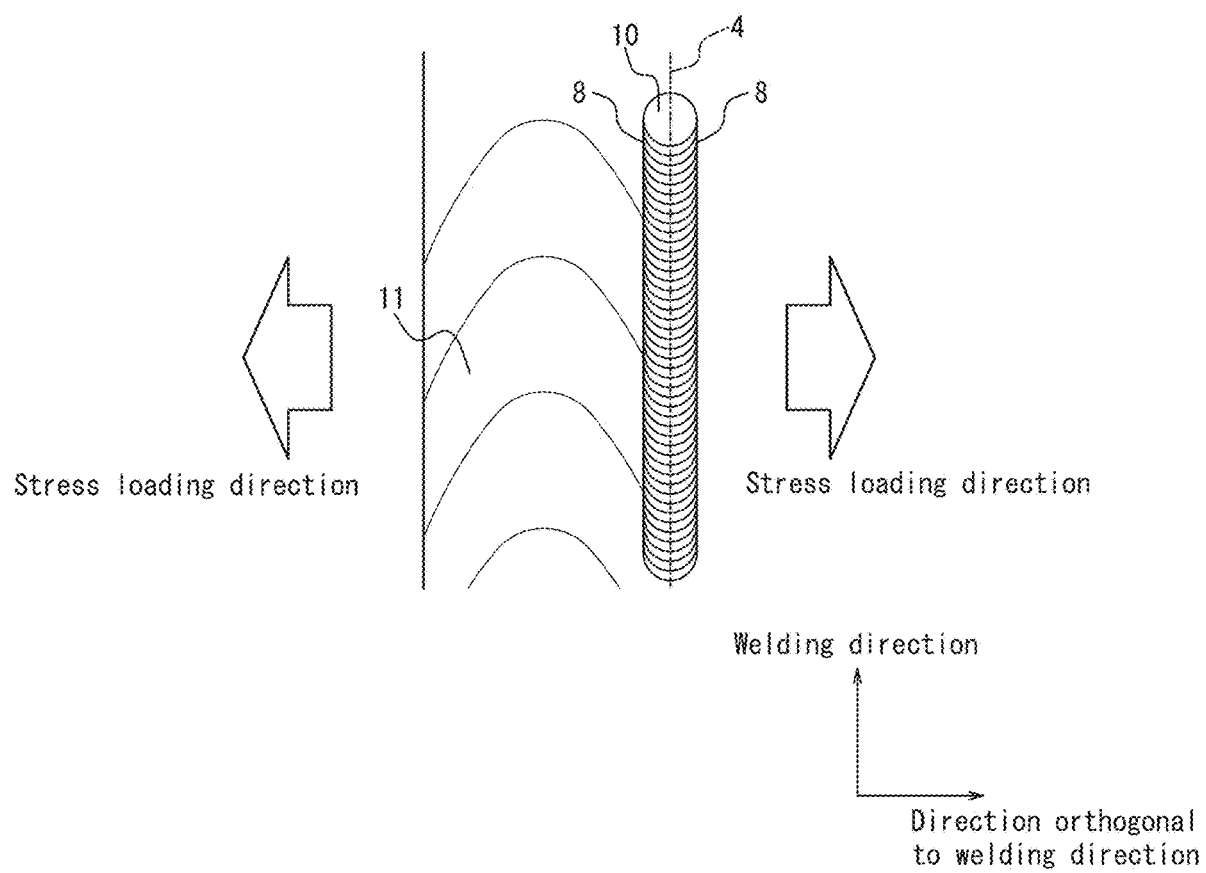
FIG. 4 is a schematic diagram illustrating a knocking mark formed by a conventional peening method and a stress loading direction of a representative fatigue fracture mode.

Specifically, as stated above, a fold mark 8 at a knocking mark edge illustrated in FIG. 2 may provide the origin of fatigue fracture. In particular, as illustrated in FIG. 4, when the lap fillet welded joint is continuously knocked along the weld toe 4 in the welding direction, fold marks 8 at knocking mark edges are continuously connected in a direction orthogonal to a stress loading direction, that is, the welding direction, and as a result, the stress intensity factor is increased to promote development of a crack, deteriorating fatigue properties. To prevent the deterioration of fatigue properties, it is effective to prevent fold marks 8 at knocking mark edges from being continuously connected in the welding direction.

Therefore, in the method of peening the first embodiment, the knocking pin 5 is continuously knocked as a series of knocking toward a direction inclined relative to the welding direction across the weld toe 4 (in other words, knocking is performed so that the knocking marks 10 are superimposed with each other and have a center line inclined relative to the welding direction) and the series of knocking is repeatedly performed in the welding direction. At that time, knocking mark groups 12 made of a plurality of knocking marks 10 as illustrated in FIG. 5 are formed by superimposing a knocking mark group 12 made of a plurality of knocking marks 10 formed by the series of knocking on at least a part of an adjacent knocking mark group 12 while separating an end part 121 of the knocking mark group 12 in a direction orthogonal to the welding direction from an end part 121 of the adjacent knocking mark group 12 in a direction orthogonal to the welding direction.

When the series of knocking is performed, it is preferable to set an inclination angle relative to the welding direction θ (hereinafter, also referred to as "scanning angle") to 30° to 45°.

When the scanning angle is set to 30° or more, since the fold mark 8 at the knocking mark edge can be particularly advantageously prevented from being continuously connected in the welding direction, the effect of improving fatigue properties is increased. On the other hand, a scanning angle of more than 45° leads to deterioration in workability.

Further, no limitation is placed on the scanning distance of the series of knocking in a direction orthogonal to the welding direction (hereinafter, also referred to as "scanning width") as long as the knocking mark group 12 is formed across the weld toe 4, yet the scanning width is preferably set to 1.0 mm or more. The upper limit of the scanning width is not particularly limited, yet it is preferably set to about 3.0 mm from the viewpoint of work efficiency.

Further, the series of knocking is preferably applied to a region up to at least about 0.5 mm on each of the weld metal side and the base sheet side around the weld toe 4 in a direction orthogonal to the welding direction, and particularly preferably applied around the weld toe 4.

Further, the distance between the centers of knocking mark groups 12 adjacent to each other on the weld toe 4 is preferably 0.70 to 0.99 times the length of a knocking mark 10 formed per knock in the welding direction. Therefore, a knocking mark group 12 made of a plurality of knocking marks 10 formed by the series of knocking can be superimposed more advantageously on at least a part of an adjacent knocking mark group 12 while an end part 121 of the knocking mark group 12 in a direction orthogonal to the welding direction can be separated from an end part 121 of the adjacent knocking mark group 12 in a direction orthogonal to the welding direction.

Further, other than the above peening conditions are not particularly limited, yet it is sufficient to follow the conventional methods. For example, in the series of knocking, the knocking frequency may be 50 Hz to 300 Hz and the scanning rate may be 3 mm/s to 30 mm/s. Moreover, the knocking angle of the knocking pin 5 (an angle formed on a plane perpendicular to the welding direction by the centerline of the knocking pin 5 and a straight line perpendicular to the base sheet (thin steel sheet) surface of the weld toe 4 of the lap fillet welded joint) may be preferably 30° to 60°.

As stated above, by knocking the weld toe 4 of the lap fillet welded joint, a welded structure having the lap fillet welded joint according to the first embodiment as illustrated in FIG. 5 can be obtained, the welded structure comprising a plurality of knocking mark groups 12 in which a plurality of knocking marks 10 run at an angle relative to the welding direction across the weld toe 4 of the lap fillet welded joint, wherein the knocking marks 10 have a curvature radius in a cross section perpendicular to the weld line direction of 0.05 mm to 0.50 mm, and each knocking mark group 12 is superimposed on at least a part of an adjacent knocking mark group 12 while an end part 121 in a direction orthogonal to a welding direction of the knocking mark group 12 is separated from an end part 121 of the adjacent knocking mark group 12 in the direction orthogonal to the welding direction.

Note that θ, which denotes the inclination angle relative to the welding direction of the knocking mark group 12 (i.e., the angle formed by the running direction of the knocking marks 10 of the knocking mark group 12 and the welding direction), is the same as the scanning angle, and L1, which denotes the width of the knocking mark group 12 (width in a direction orthogonal to the welding direction), is the same as the scanning width. θ is preferably in a range of 30° to 45° and L1 is preferably in a range of 1.0 mm to 3.0 mm.

Second Embodiment

The method of peening a lap fillet welded joint according to a second embodiment, comprising knocking a weld toe 4 of the lap fillet welded joint using a knocking pin 5 attached to a tip of a knocking tool, wherein the knocking pin 5 has, on its tip, a curvature radius in a vertical cross section in a direction orthogonal to a welding direction of 0.05 mm to 0.50 mm and equal to or less than a curvature radius of the weld toe 4, the knocking pin 5 is knocked while the knocking pin 5 is oscillated in a direction orthogonal to the welding direction across the weld toe 4 and moved in the welding direction, the knocking pin 5 has an oscillation width around the weld toe at least twice a width of the knocking mark 10 per knock point, and in a knocking region 13 defined according to the oscillation width of the knocking pin 5, end parts 101 of knocking marks 10 that are located in an end part along a width direction of the knocking region 13 and superimposed on each other, are separated from each other in a direction orthogonal to the welding direction, or knocking marks 10 located in an end part along the width direction of the knocking region 13 are contacted with each other in the welding direction at three knock points or less.

The method of peening a lap fillet welded joint according to the second embodiment is described below.

A curvature radius of a knocking pin tip 6 being 0.05 mm to 0.50 mm and equal to or less than a curvature radius of a weld toe 4

As stated above, when weld ripples 9 formed at the weld toe 4 during welding are collapsed to be flattened, stress concentration is relaxed even if the curvature radius of the knocking pin tip 6 is decreased and a fold mark 7 at the weld toe can be effectively prevented from occurring. Therefore, the curvature radius of the knocking pin tip 6 is set to 0.50 mm or less and equal to or less than the curvature radius of the weld toe 4 of the welded joint before peening. Further, from the viewpoint of effectively collapsing the weld ripples 9, the curvature radius of the knocking pin tip 6 needs to be set to 0.05 mm or more.

For example, in the case of a lap fillet welded joint having a thin steel sheet with a thickness of 3.6 mm or less as a base sheet, the curvature radius of the weld toe 4 is typically about 0.50 mm to 1.0 mm, and thus the knocking pin tip 6 having a curvature radius of 0.05 mm to 0.50 mm is used.

Further, in the method of peening a lap fillet welded joint according to the second embodiment, the knocking pin 5 is knocked while the knocking pin 5 is oscillated in a direction orthogonal to the welding direction across the weld toe 4 and moved in the welding direction. At that time, the oscillation width of the knocking pin 5 is set to be at least twice the width of the knocking mark 10 per knock point, that is, the width (in a direction orthogonal to the welding direction) of one knocking mark.

Specifically, as stated above, the fold mark 8 at the knocking mark edge illustrated in FIG. 2 may provide the origin of fatigue fracture. In particular, as illustrated in FIG. 4, when the lap fillet welded joint is continuously knocked along the weld toe 4, the fold mark 8 at the knocking mark edge are continuously connected in a direction orthogonal to a stress loading direction, that is, the welding direction, and as a result, the stress intensity factor is increased to promote development of a crack, deteriorating fatigue properties.

Figure 6:
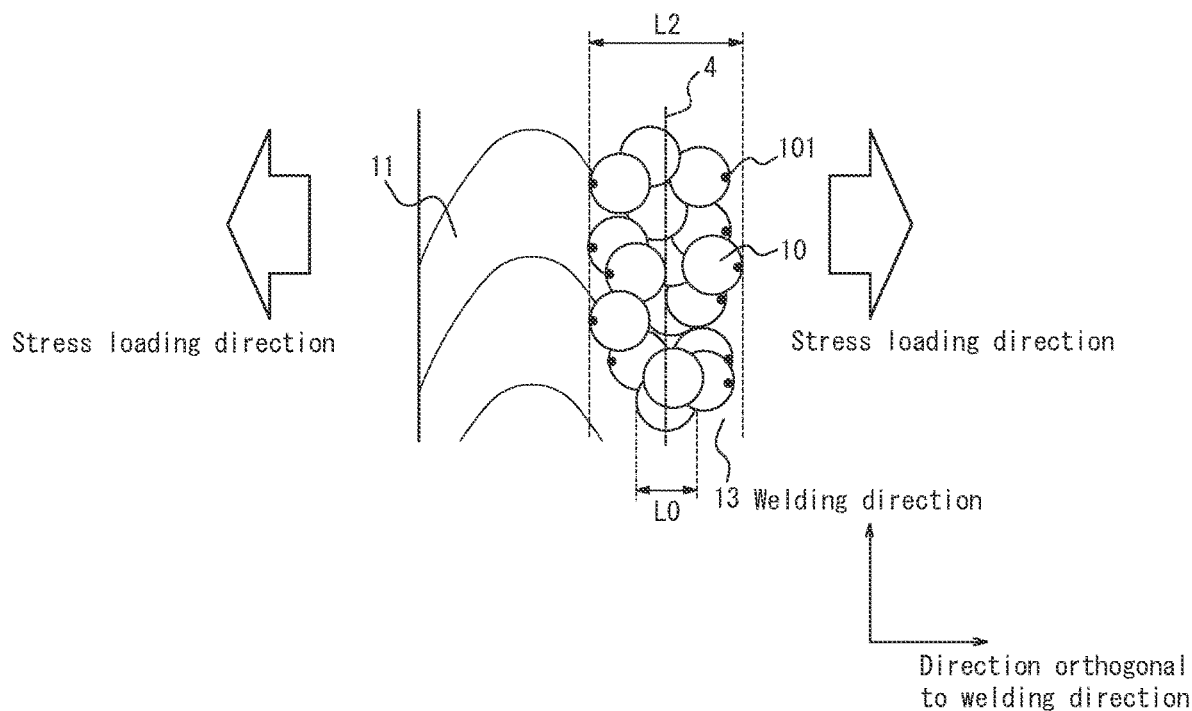
FIG. 6 is a schematic diagram illustrating a knocking mark (knocking region) formed by a peening method according to another embodiment and a stress loading direction of a representative fatigue fracture mode.

Therefore, in the method of peening a lap fillet welded joint according to the second embodiment, the knocking pin 5 is knocked while the knocking pin 5 is oscillated in a direction orthogonal to the welding direction across the weld toe 4 (in other words, the knocking pin 5 is oscillated so that the knocking pin 5 crosses the weld toe 4 at least a predetermined number of times and the knocking marks 10 formed by the knocking are superimposed on one another) and moved in the welding direction. At that time, as illustrated in FIG. 6, by setting the oscillation width of the knocking pin 5 (in a direction orthogonal to the welding direction) to be at least twice, and preferably 2.5 times or more of a width of one knocking mark 10, L0, the knocking region 13 having a plurality of knocking marks 10 is formed and end parts 101 in a direction orthogonal to the welding direction of knocking marks that are 10 located in an end part along a width direction of the knocking region 13 and superimposed on each other, are separated from each other, or knocking marks 10 located in an end part along the width direction of the knocking region 13 are contacted with each other in the welding direction at three knock points or less.

As used herein, the end part 101 in a direction orthogonal to the welding direction of the knocking mark 10 refers to a region ranging from the end in a direction orthogonal to the welding direction of the knocking mark 10 on an end part along a width direction of the knocking region 13 to 1% of the width of the knocking mark 10.

Therefore, it becomes possible to prevent the fold mark 8 at the knocking mark edge from continuously running in the welding direction to improve fatigue properties.

The upper limit of the oscillation width is not particularly limited, but it is preferably set to 3.0 mm from the viewpoint of work efficiency.

Further, the oscillation range preferably includes a region at least including the weld toe 4 in the center and extending by about 0.5 mm to both the weld metal side and the base sheet side in a direction orthogonal to the welding direction, and particularly preferably includes the weld toe 4 in the center.

Moreover, preferably, the knocking frequency is set to 50 Hz to 300 Hz, the oscillation frequency is set to 1 Hz to 20 Hz, and the scanning rate is set to 0.1 mm/s to 20 mm/s.

Other than the above peening conditions are not particularly limited, yet it is sufficient to follow the conventional methods.

As stated above, by knocking a weld toe 4 of a lap fillet welded joint, a welded structure having the lap fillet welded joint according to the second embodiment can be obtained, the welded structure comprising a knocking region 13 having a plurality of knocking marks 10 running across the weld toe 4 of the lap fillet welded joint, wherein in the knocking region 13, the knocking marks 10 have a total length on the weld toe 4 of 50% or more of the whole length of the weld toe 4, and the knocking region 13 has a width at least twice a width of a knocking mark 10 per knock point, and further, in the knocking region 13, end parts 101 of knocking marks 10 that are located in an end part along a width direction of the knocking region 13 and superimposed on each other, are separated from each other in a direction orthogonal to the welding direction, or knocking marks 10 located in an end part along the width direction of the knocking region 13 are contacted with each other in the welding direction at three knock points or less.

The knocking region 13 is defined as a region having a maximum width (maximum width in a direction orthogonal to the welding direction), L2, the region including a plurality of contiguous (or mutually superimposed) knocking marks 10 as illustrated in FIG. 6.

However, from the viewpoint of sufficiently obtaining a stress relieving effect by peening, it is necessary to make the total length on the weld toe 4 of the knocking marks 10 in the knocking region 13 50% or more of the whole length of the weld toe 4. The total length on the weld toe 4 of the knocking marks 10 is preferably 70% or more and more preferably 90% or more of the whole length of the weld toe 4. Alternatively, it may be 100%.

Adjusting the knocking frequency, oscillation frequency, and scanning rate in the welding direction to the above ranges makes it possible that in the knocking region, as illustrated in FIG. 6, the knocking marks 10 have a total length on the weld toe 4 of 50% or more of the whole length of the weld toe 4 and in the knocking region 13, end parts 101 of knocking marks 10 that are located in an end part along a width direction of the knocking region 13 and superimposed on each other, are separated from each other in a direction orthogonal to the welding direction, or knocking marks 10 located in an end part along the width direction of the knocking region 13 are contacted with each other in the welding direction at three knock points or less.

Further, in particular, adjusting the knocking frequency to 50 Hz to 150 Hz, oscillation frequency to 1 Hz to 10 Hz, and scanning rate in the welding direction to 0.1 mm/s to 5 mm/s makes it possible that in the knocking region, the knocking marks have a total length on the weld toe of 90% or more of the whole length of the weld toe.

Moreover, from the viewpoint of improving fatigue properties, it is preferable that the straight line connecting the centers of knocking marks 10 superimposed on each other is not parallel to the welding direction. Therefore, it is preferable that the knocking frequency $f_1$ is inconsistent with the oscillation frequency $f_2$, specifically, $f_1/f_2$ is a non-integer.

The width of the knocking region 13, L2 is typically almost the same as the oscillation width. Therefore, the knocking region 13 has a width at least twice a width of one knocking mark. The knocking region 13 preferably has a width of 2.5 times or more of a width of one knocking mark. The width of the knocking region 13, L2 is preferably 3.0 mm or less, and more preferably 1.0 mm or less.

While the first and second embodiments have been described above, it is particularly preferable to apply the peening according to these embodiments to a lap fillet welded joint having a thin steel sheet with a thickness of 1.0 mm to 3.6 mm (more preferably, 2.0 mm to 3.0 mm) and a tensile strength of 780 MPa or more as a base sheet.

Further, the knocking pin 5 has any tip shape if the curvature radius of the tip is equal to or less than the curvature radius of the weld toe 4. For example, the knocking pin 5 may have a tip with a semicylindrical, hemispherical, semielliptical, or approximately semicylindrical shape.

Moreover, when the peening is performed according to the embodiments stated above, not only an air-driven device and ultrasonic device but also an electric device can be also used, and thus, it is very advantageous in terms of workability.

In addition, the welding method is not particularly limited, and the peening method can be applied to any welded joint obtained by, for example, arc welding and laser welding.

Figure 8:
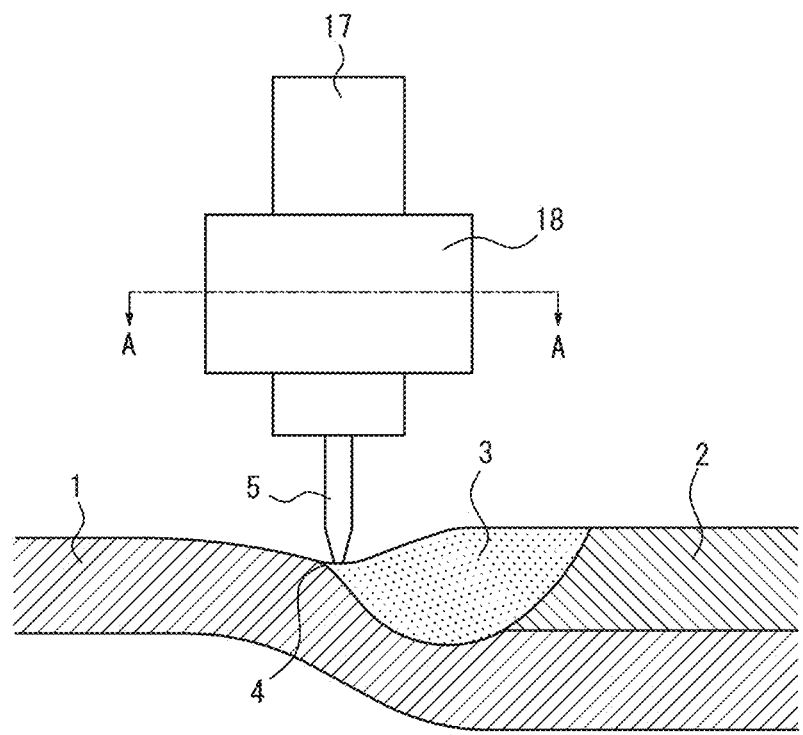
FIG. 8 is a schematic diagram illustrating a holding manner of a knocking tool in a knocking tool holder.
Figure 9:
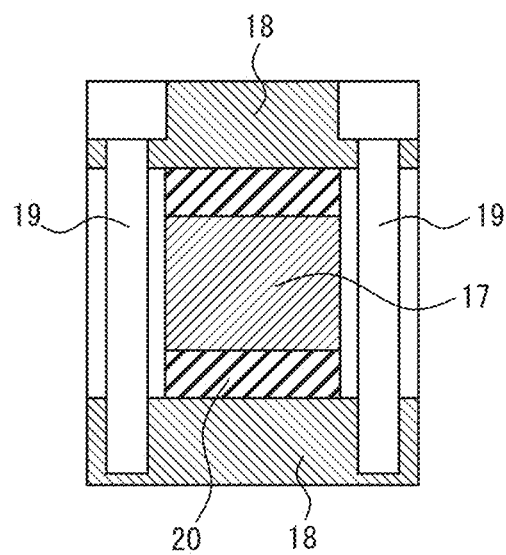
FIG. 9 is a sectional view taken along line A-A of FIG. 8.

Further, although the holding method of the knocking tool 17 is not particularly specified, when the knocking tool 17 is pressed against the weld toe 4 using the knocking tool holder 18 as illustrated in FIG. 8, it is desirable from the reason stated above to clamp the knocking tool 17 with the viscoelastic material 20 as illustrated in FIG. 9. In FIG. 9, reference sign 19 indicates a bolt.

The material property of the viscoelastic material 20 is not particularly limited if it has viscosity which makes the vibration of the knocking tool holder 18 inconsistent with that of the knocking pin 5. However, a polymer substance such as rubber and gel is preferable.

EXAMPLES

Example 1

An example according to the first embodiment will be described.

Steel sheets with a size of 300 mm×70 mm (thickness: 2.9 mm) were cut out of various steel materials. Two steel sheets thus cut out were fixed with a jig and subjected to lap fillet arc welding under the conditions listed in Table 1 to produce various lap fillet arc welded joints. Next, a weld toe 4 of each produced lap fillet arc welded joint was subjected to peening using an electric or air-driven (air pressure of 0.5 MPa) device under the conditions listed in Tables 2 and 4 to 6 to form knocking marks 10 on the lap fillet arc welded joint as illustrated in FIG. 5.

The peening was performed until a slag of the surface of the weld toe 4 was fractured and the internal metallic luster was exposed. Further, the knocking pin 5 was continuously knocked as a series of knocking toward a direction inclined relative to the welding direction across the weld toe 4, the series of knocking was repeatedly performed in the welding direction, and at that time, a knocking mark group 12 made of a plurality of knocking marks 10 formed by the series of knocking was superimposed on at least a part of an adjacent knocking mark group 12 while an end part 121 of the knocking mark group 12 in a direction orthogonal to the welding direction was separated from an end part 121 of the adjacent knocking mark group 12 in a direction orthogonal to the welding direction. Further, the used knocking pin 5 had a tip with a hemispherical shape. The scanning rate in the series of knocking was 10 mm/s.

The curvature radius of the weld toe 4 as listed in Tables 4 to 6 was determined by averaging the measurement results at five locations for each welded joint according to NPL 2.

Figure 7:
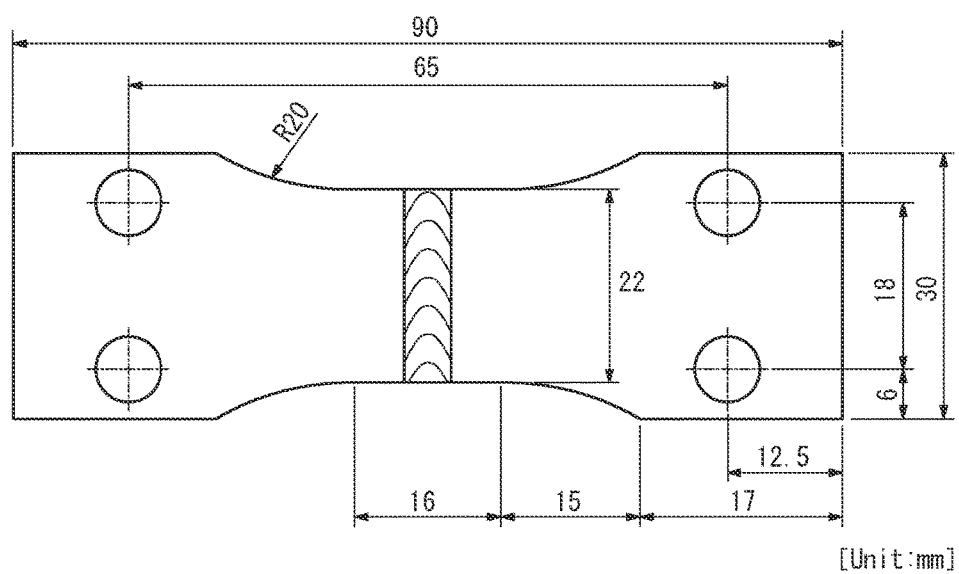
FIG. 7 is a diagram illustrating a shape of a test piece.

Test pieces having a shape illustrated in FIG. 7 were collected from the lap fillet arc welded joints after the peening so that a weld bead 11 became the center part of the test piece. Using the test pieces, plane bending fatigue test was conducted in accordance with JIS Z 2275 under the conditions listed in Table 3 to evaluate fatigue properties based on the following criterion.

Passed (Particularly Excellent): Fatigue life was beyond three million times (if the test piece was not fractured at a stress repeating count of three million, fatigue life was judged as beyond three million times).

Passed (Excellent): Fatigue life was two million times or more and three million times or less.

Failed: Fatigue life was less than two million times.

The evaluation results are also listed in Tables 4 to 6.

TABLE 1

| Shielding gas | Current (A) | Voltage (V) | Welding rate (cm/min) |
| --- | --- | --- | --- |
| 80 vol. % Ar—20 vol. % $CO_2$ | 230 | 23 | 80 |

TABLE 2

| Device | Knocking pin diameter (mm) | Knocking frequency (Hz) |
| --- | --- | --- |
| Electric type | 3 | 100 |
| Air-driven type | 3 | 20 |

TABLE 3

| Nominal stress range (MPa) | Stress ratio | Frequency (Hz) | Counts when test ends |
| --- | --- | --- | --- |
| 500 | 0 | 10 | 3 million times |

TABLE 4

| | Peening conditions | | | | | |
| --- | --- | --- | --- | --- | --- | --- |
| No. | Tensile strength of steel sheet (base sheet) (MPa) | Curvature radius of knocking pin (mm) | Curvature radius of weld toe before peening (mm) | Device | Scanning angle (°) | Scanning width (mm) |
| 1 | 980 | 0.04 | 0.50 | electric type | 30 | 1.0 |
| 2 | 980 | 0.05 | 0.50 | electric type | 30 | 1.0 |
| 3 | 980 | 0.10 | 0.50 | electric type | 30 | 1.0 |
| 4 | 980 | 0.40 | 0.50 | air-driven type | 30 | 1.0 |
| 5 | 980 | 0.50 | 0.50 | air-driven type | 30 | 1.0 |
| 6 | 980 | 0.51 | 0.50 | air-driven type | 30 | 1.0 |

| | Shape of weld toe after peening | | | | | |
| --- | --- | --- | --- | --- | --- | --- |
| No. | Curvature radius of knocking mark (mm) | Inclination angle relative to welding direction of knocking mark group θ (°) | Width of knocking mark group L1 (mm) | Presence/absence of fold mark in weld toe | Fatigue life (times) | Remarks |
| 1 | 0.04 | 30 | 1.0 | absent | 1.5 mill. | Comparative Example |
| 2 | 0.05 | 30 | 1.0 | absent | 2.5 mill. | Example |
| 3 | 0.10 | 30 | 1.0 | absent | beyond 3 mill. | Example |
| 4 | 0.40 | 30 | 1.0 | absent | beyond 3 mill. | Example |

TABLE 4-continued

| 5 | 0.50 | 30 | 1.0 | absent | 2.5 mill. | Example |
| 6 | 0.51 | 30 | 1.0 | present | 0.31 mill. | Comparative Example |

TABLE 5

| | | Peening conditions | | | | |
|---|---|---|---|---|---|---|
| No. | Tensile streangth of steel sheet (base sheet) (MPa) | Curvature radius of knocking pin (mm) | Curvature radius of weld toe before peening (mm) | Device | Scanning angle (°) | Scanning width (mm) |
| 7 | 980 | 0.10 | 0.50 | electric type | 0 | 1.0 |
| 8 | 980 | 0.10 | 0.50 | electric type | 20 | 1.0 |
| 9 | 980 | 0.10 | 0.50 | electric type | 30 | 1.0 |
| 10 | 980 | 0.10 | 0.50 | electric type | 45 | 1.0 |
| 11 | 980 | 0.10 | 0.50 | electric type | 50 | 1.0 |

| | Shape of weld toe after peening | | | | | |
|---|---|---|---|---|---|---|
| No. | Curvature radius of knocking mark (mm) | Inclination angle relative to welding direction of knocking mark group θ (°) | Width of knocking mark group L1 (mm) | Presence/ absence of fold mark in weld toe | Fatigue life (times) | Remarks |
| 7 | 0.10 | 0 | 1.0 | absent | 1 mill. | Comparative Example |
| 8 | 0.10 | 20 | 1.0 | absent | 2.5 mill. | Example |
| 9 | 0.10 | 30 | 1.0 | absent | beyond 3 mill. | Example |
| 10 | 0.10 | 45 | 1.0 | absent | beyond 3 mill. | Example |
| 11 | 0.10 | 50 | 1.0 | absent | 2.5 mill. | Example |

TABLE 6

| | | Peening conditions | | | | |
|---|---|---|---|---|---|---|
| No. | Tensile streangth of steel sheet (base sheet) (MPa) | Curvature radius of knocking pin (mm) | Curvature radius of weld toe before peening (mm) | Device | Scanning angle (°) | Scanning width (mm) |
| 12 | 980 | 0.10 | 0.50 | electric type | 30 | 1.0 |
| 13 | 780 | 0.10 | 0.50 | electric type | 30 | 1.0 |
| 14 | 690 | 0.10 | 0.50 | electric type | 30 | 1.0 |
| 15 | 590 | 0.10 | 0.50 | electric type | 30 | 1.0 |
| 16 | 440 | 0.10 | 0.50 | electric type | 30 | 1.0 |

| | Shape of weld toe after peening | | | | | |
|---|---|---|---|---|---|---|
| No. | Curvature radius of knocking mark (mm) | Inclination angle relative to welding direction of knocking mark group θ (°) | Width of knocking mark group L1 (mm) | Presence/ absence of fold mark in weld toe | Fatigue life (times) | Remarks |
| 12 | 0.10 | 30 | 1.0 | absent | beyond 3 mill. | Example |
| 13 | 0.10 | 30 | 1.0 | absent | beyond 3 mill. | Example |
| 14 | 0.10 | 30 | 1.0 | absent | 2.6 mill. | Example |
| 15 | 0.10 | 30 | 1.0 | absent | 2.3 mill. | Example |
| 16 | 0.10 | 30 | 1.0 | absent | 2 mill. | Example |

As listed in Tables 4 to 6, our examples had excellent fatigue life.

Further, as listed in Table 5, when an inclination angle relative to the welding direction is controlled to be 30° to 45°, excellent fatigue life was obtained.

Moreover, as listed in Table 6, when a steel sheet having a tensile strength of 780 MPa or more was used as a base sheet, fatigue properties could be advantageously improved.

Example 2

An example according to the second embodiment stated above will be described.

Steel sheets with a size of 300 mm×70 mm (thickness: 2.9 mm) were cut out of various steel materials. Two steel sheets thus cut out were fixed with a jig and subjected to lap fillet arc welding under the conditions listed in Table 1 to produce various lap fillet art welded joints. Next, a weld toe 4 of each produced lap fillet arc welded joint was subjected to peening using an electric or air-driven (air pressure of 0.5 MPa) device under the conditions listed in Tables 2 and 7 to 9 while the knocking pin 5 was oscillated in a direction orthogonal to the welding direction around the weld toe 4. The peening was performed until a slag of the surface of the weld toe 4 was fractured and the internal metallic luster was exposed. Further, the used knocking pin 5 had a tip with a hemispherical shape.

The curvature radiuses of the weld toes 4 listed in Tables 7 to 9 were determined by averaging the measurement results at five locations for each welded joint according to NPL 2.

In any example in which the knocking pin 5 was oscillated, in a knocking region 13 determined according to the oscillation width of the knocking pin 5, knocking marks 10 located in an end part along a width direction of the knocking region 13 and superimposed on each other had end parts 101 separated from each other in a direction orthogonal to the welding direction, or knocking marks 10 located in an end part along the width direction of the knocking region 13 were contacting with each other in the welding direction at three knock points or less.

Test pieces having a shape illustrated in FIG. 7 were collected from the lap fillet arc welded joints after the peening so that a weld bead 11 became the center part of the test piece. Using the test pieces, plane bending fatigue test was conducted in accordance with JIS Z 2275 under the conditions listed in Table 3 to evaluate fatigue properties based on the following criterion.

Passed (Particularly Excellent): Fatigue life was beyond three million times (if the test piece was not fractured at a stress repeating count of three million, fatigue life was judged as beyond three million times).

Passed (Excellent): Fatigue life was two million times or more and three million times or less.

Failed: Fatigue life was less than two million times.

The evaluation results are also listed in Tables 7 to 9.

TABLE 7

| | Peening conditions | | | | | | |
|---|---|---|---|---|---|---|---|
| No. | Tensile streangth of steel sheet (base sheet) (MPa) | Curvature radius of knocking pin (mm) | Curvature radius of weld toe before peening (mm) | Device | Oscillation width (mm) | Oscillation frequency (Hz) | Scanning rate (mm/s) |
| 101 | 980 | 0.04 | 0.50 | electric type | 0.6 | 7 | 1 |
| 102 | 980 | 0.05 | 0.50 | electric type | 0.6 | 7 | 1 |
| 103 | 980 | 0.10 | 0.50 | electric type | 0.6 | 7 | 1 |
| 104 | 980 | 0.40 | 0.50 | air-driven type | 0.6 | 7 | 1 |
| 105 | 980 | 0.50 | 0.50 | air-driven type | 0.6 | 7 | 1 |
| 106 | 980 | 0.51 | 0.50 | air-driven type | 0.6 | 7 | 1 |

| | Shape of weld toe after peening | | | | | | |
|---|---|---|---|---|---|---|---|
| No. | Curvature radius of knocking mark (mm) | Width of one knocking mark L0 (mm) | Width of knocking region L2 (mm) | Ratio of total length of knocking marks on weld toe to whole length of weld toe (%) | Presence/absence of fold mark in weld toe | Fatigue life (times) | Remarks |
| 101 | 0.04 | 0.2 | 0.6 | 90 | absent | 1.5 mill. | Comparative Example |
| 102 | 0.05 | 0.2 | 0.6 | 90 | absent | 2.5 mill. | Example |
| 103 | 0.10 | 0.2 | 0.6 | 90 | absent | beyond 3 mill. | Example |
| 104 | 0.40 | 0.2 | 0.6 | 70 | absent | beyond 3 mill. | Example |
| 105 | 0.50 | 0.2 | 0.6 | 70 | absent | 2.5 mill. | Example |
| 106 | 0.51 | 0.2 | 0.6 | 70 | present | 0.31 mill. | Comparative Example |

TABLE 8

| | Peening conditions | | | | | | |
|---|---|---|---|---|---|---|---|
| No. | Tensile strength of steel sheet (base sheet) (MPa) | Curvature radius of knocking pin (mm) | Curvature radius of weld toe before peening (mm) | Device | Oscillation width (mm) | Oscillation frequency (Hz) | Scanning rate (mm/s) |
| 107 | 980 | 0.10 | 0.50 | electric type | 0.6 | 7 | 7 |
| 108 | 980 | 0.10 | 0.50 | electric type | 0.5 | 7 | 7 |
| 109 | 980 | 0.10 | 0.50 | electric type | 0.4 | 7 | 7 |
| 110 | 980 | 0.10 | 0.50 | electric type | 0.6 | 4 | 4 |
| 111 | 980 | 0.10 | 0.50 | electric type | | nooscillation | |

| | Shape of weld toe after peening | | | | | | |
|---|---|---|---|---|---|---|---|
| No. | Curvature radius of knocking mark (mm) | Width of one knocking mark L0 (mm) | Width of knocking region L2 (mm) | Ratio of total length of knocking marks on weld toe to whole length of weld toe (%) | Presence/absence of fold mark in weld toe | Fatigue life (times) | Remarks |
| 107 | 0.10 | 0.2 | 0.6 | 70 | absent | beyond 3 mill. | Example |
| 108 | 0.10 | 0.2 | 0.5 | 70 | absent | beyond 3 mill. | Example |
| 109 | 0.10 | 0.2 | 0.4 | 70 | absent | 2 mill. | Example |
| 110 | 0.10 | 0.2 | 0.6 | 90 | absent | 2 mill. | Example |
| 111 | 0.10 | 0.2 | 0.2 | 100 | absent | 1 mill. | Comparative Example |

TABLE 9

| | Peening conditions | | | | | | |
|---|---|---|---|---|---|---|---|
| No. | Tensile strength of steel sheet (base sheet) (MPa) | Curvature radius of knocking pin (mm) | Curvature radius of weld toe before peening (mm) | Device | Oscillation width (mm) | Oscillation frequency (Hz) | Scanning rate (mm/s) |
| 112 | 980 | 0.10 | 0.50 | electric type | 0.6 | 7 | 7 |
| 113 | 780 | 0.10 | 0.50 | electric type | 0.6 | 7 | 7 |
| 114 | 690 | 0.10 | 0.50 | electric type | 0.6 | 7 | 7 |
| 115 | 590 | 0.10 | 0.50 | electric type | 0.6 | 7 | 7 |
| 116 | 440 | 0.10 | 0.50 | electric type | 0.6 | 7 | 7 |

| | Shape of weld toe after peening | | | | | | |
|---|---|---|---|---|---|---|---|
| No. | Curvature radius of knocking mark (mm) | Width of one knocking mark L0 (mm) | Width of knocking region L2 (mm) | Ratio of total length of knocking marks on weld toe to whole length of weld toe (%) | Presence/absence of fold mark in weld toe | Fatigue life (times) | Remarks |
| 112 | 0.10 | 0.2 | 0.6 | 70 | absent | beyond 3 mill. | Example |
| 113 | 0.10 | 0.2 | 0.6 | 70 | absent | beyond 3 mill. | Example |
| 114 | 0.10 | 0.2 | 0.6 | 70 | absent | 2.6 mill. | Example |
| 115 | 0.10 | 0.2 | 0.6 | 70 | absent | 2.3 mill. | Example |
| 116 | 0.10 | 0.2 | 0.6 | 70 | absent | 2 mill. | Example |

As listed in Tables 7 to 9, our examples had excellent fatigue life.

Further, as listed in Table 8, when the oscillation width of the knocking pin 5 was 2.5 times or more of the width of one knocking mark, particularly excellent fatigue life was obtained.

Moreover, as listed in Table 9, when a steel sheet having a tensile strength of 780 MPa or more was used as a base sheet, fatigue properties could be advantageously improved.

Example 3

To demonstrate an effect when a knocking tool was clamped with a viscoelastic material in fixing the knocking tool with a holding jig, the peening was performed with the method according to the first embodiment while the knocking tool was held in such a way as illustrated in FIGS. 8 and 9. The method is described below.

Steel sheets (thickness of 2.9 mm) were subjected to lap fillet arc welding under the conditions listed in Table 1 to produce various lap fillet arc welded joints. Next, a weld toe 4 of each produced lap fillet arc welded joint was subjected to peening using an air-driven (air pressure of 0.5 MPa) device under the conditions listed in Tables 2 and 11 to form knocking marks 5 on the lap fillet arc welded joint as illustrated in FIG. 5.

A knocking tool 17 was clamped with a viscoelastic material 20 as illustrated in FIGS. 8 and 9 by inserting the viscoelastic material 20 between the knocking tool 17 which had a mechanism of oscillating a knocking pin 5 and a knocking tool holder 18, and fastening a bolt 19. In the example, a gel sheet made of silicon was used as the viscoelastic material 20.

The peening was performed until a slag of the surface of the weld toe 4 was fractured and the internal metallic luster was exposed. Further, the knocking pin 5 was continuously knocked as a series of knocking toward a direction inclined relative to a welding direction across the weld toe 4, and the series of knocking was repeatedly performed in the welding direction. At that time, a knocking mark group 12 made of a plurality of knocking marks 10 formed by the series of knocking was superimposed on at least a part of an adjacent knocking mark group 12 while an end part 121 of the knocking mark group 12 in a direction orthogonal to the welding direction was separated from an end part 121 of the adjacent knocking mark group 12 in a direction orthogonal to the welding direction. Further, the used knocking pin 5 had a tip with a hemispherical shape. The scanning rate in the series of knocking was 5 mm/s.

The curvature radiuses of the weld toes 4 listed in Table 11 were determined by averaging the measurement results at five locations for each welded joint according to NPL 3.

Test pieces having a shape illustrated in FIG. 7 were collected from the lap fillet arc welded joints after the peening so that a weld bead 11 became the center part of the test piece. Using the test pieces, plane bending fatigue test was conducted in accordance with JIS Z 2275 under the conditions listed in Table 10 to evaluate fatigue properties based on the following criterion.

Passed (Particularly Excellent): Fatigue life was beyond three million times (if the test piece was not fractured at a stress repeating count of three million, fatigue life was judged as beyond three million times).

Passed (Excellent): Fatigue life was two million times or more and three million times or less.

Failed: Fatigue life was less than two million times.

The evaluation results are also listed in Table 11.

TABLE 10

| Nominal stress range (MPa) | Stress ratio | Frequency (Hz) | Counts when test ends |
|---|---|---|---|
| 600 | 0 | 10 | 3 mill. |

TABLE 11

| | | Peening conditions | | | | |
|---|---|---|---|---|---|---|
| No. | Tensile streangth of base sheet (MPa) | Curvature radius of knocking pin $\rho_p$ (mm) | Curvature radius of weld toe before peening $\rho_a$ (mm) | Knocking angle $\beta$ (°) | Scanning angle (°) | Scanning width (mm) |
| 2 | 980 | 0.5 | 1.8 | 0 | 30 | 5 |
| 114 | 980 | 0.5 | 1.8 | 0 | 30 | 5 |

| No. | Peening conditions Presence/ absence of viscoelastic material of holder | Shape of weld toe after peening | | | Fatigue life (times) | Remarks |
|---|---|---|---|---|---|---|
| | | Curvature radius of knocking mark (mm) | Inclination angle relative to welding direction of knocking mark group (°) | Width of knocking mark group L1 (mm) | | |
| 2 | absent | 1.5 | 30 | 5 | 2.1mill. | Example |
| 114 | present | 1.5 | 30 | 5 | beyond 3 mill. | Example |

As listed in Table 11, particularly excellent fatigue life was obtained when the knocking tool was clamped with the viscoelastic material.

Example 4

As with Example 3, to demonstrate an effect when a knocking tool was clamped with a viscoelastic material in fixing the knocking tool with a holding jig, the peening was performed with the method according to the second embodiment while the knocking tool was held in such a way as illustrated in FIGS. 8 and 9. The method is described below.

Steel sheets (thickness of 2.9 mm) were subjected to lap fillet arc welding under the conditions listed in Table 1 to produce various lap fillet arc welded joints. Next, a weld toe 4 of each produced lap fillet arc welded joint was subjected to peening using an air-driven (air pressure of 0.5 MPa) device under the conditions listed in Tables 2 and 12 while a knocking pin 5 was oscillated in a direction orthogonal to the welding direction around the weld toe 4.

The peening was performed until a slag of the surface of the weld toe 4 was fractured and the internal metallic luster was exposed. Further, the used knocking pin 5 had a tip with a hemispherical shape.

A knocking tool 17 was clamped with a viscoelastic material 20 as illustrated in FIGS. 8 and 9 by inserting the viscoelastic material 20 between the knocking tool 17 which has a mechanism of oscillating the knocking pin 5 and a knocking tool holder 18, and fastening a bolt 19. In the example, a gel sheet made of silicon was used as the viscoelastic material 20.

The curvature radius of the weld toe 4 listed in Table 12 were determined by averaging the measurement results at five locations for each welded joint according to NPL 3.

In any example in which the knocking pin 5 was oscillated, in a knocking region 13 determined according to the oscillation width of the knocking pin 5, knocking marks 10 located in an end part along a width direction of the knocking region 13 and superimposed on each other had end parts 101 separated from each other in a direction orthogonal to the welding direction, or knocking marks 10 located in an end part along the width direction of the knocking region 13 were contacting with each other in the welding direction at three knock points or less.

Test pieces having a shape illustrated in FIG. 7 were collected from the lap fillet arc welded joints after the peening so that a weld bead 11 became the center part of the test piece. Using the test pieces, plane bending fatigue test was conducted in accordance with JIS Z 2275 under the conditions listed in Table 10 to evaluate fatigue properties based on the following criterion.

Passed (Particularly Excellent): Fatigue life was beyond three million times (if the test piece was not fractured at a stress repeating count of three million, fatigue life was judged as beyond three million times).

Passed (Excellent): Fatigue life was two million times or more and three million times or less.

Failed: Fatigue life was less than two million times.

The evaluation results are also listed in Table 12.

10: Knocking mark
101: End part in a direction orthogonal to the welding direction of a knocking mark
11: Weld bead
12: Knocking mark group
121: End part of a knocking mark group
13: Knocking region
17: Knocking tool
18: Knocking tool holder
19: Bolt
20: Viscoelastic material

The invention claimed is:

1. A method of peening a lap fillet welded joint, comprising knocking a weld toe of the lap fillet welded joint using a knocking pin attached to a tip of a knocking tool, wherein
   the knocking pin has, on its tip, a curvature radius in a vertical cross section in a direction orthogonal to a welding direction of 0.05 mm to 0.50 mm and equal to or less than a curvature radius of the weld toe,
   the knocking pin is continuously knocked as a series of knocking toward a direction inclined relative to the welding direction across the weld toe,
   the series of knocking is repeatedly performed in the welding direction, and
   at that time, a knocking mark group made of a plurality of knocking marks formed by the series of knocking is partially superimposed on an adjacent knocking mark group, while, except for the superimposed part, an end part in the direction orthogonal to the welding direction of the knocking mark group is separated from an end part in the direction orthogonal to the welding direction of the adjacent knocking mark group.

2. The method of peening a lap fillet welded joint according to claim 1, wherein the series of knocking is performed at an inclination angle relative to the welding direction of 30° to 45°.

3. The peening method according to claim 2, wherein the knocking tool is clamped with a viscoelastic material on a holder of the knocking tool.

4. The peening method according to claim 1, wherein the knocking tool is clamped with a viscoelastic material on a holder of the knocking tool.

TABLE 12

| | Peening conditions | | | | | | |
|---|---|---|---|---|---|---|---|
| No. | Tensile streangth of base sheet (MPa) | Curvature radius of knocking pin $\rho_p$ (mm) | Curvature radius of weld toe before peening $\rho_a$ (mm) | Knocking angle β (°) | Oscillation width (mm) | Oscillation frequency (Hz) | Scanning rate (mm/s) |
| 102 | 980 | 0.5 | 1.8 | 0 | 3 | 7 | 3 |
| 115 | 980 | 0.5 | 1.8 | 0 | 3 | 7 | 3 |

| | | Shape of weld toe after peening | | | | |
|---|---|---|---|---|---|---|
| No. | Peening conditions Presence/ absence of viscoelastic material of holder | Curvature radius of knocking mark (mm) | Width of one knocking mark L0 (mm) | Width of knocking mark group L2 (mm) | Ratio of total length of knocking marks on weld toe to whole length of weld toe (%) | Fatigue life (times) | Remarks |
| 102 | absent | 1.5 | 1 | 3 | 90 | 2.1mill. | Example |
| 115 | present | 1.5 | 1.5 | 3 | 100 | beyond 3 mill. | Example |

As listed in Table 12, particularly excellent fatigue life was obtained when the knocking tool was clamped with the viscoelastic material.

REFERENCE SIGNS LIST

1: Thin steel sheet (base sheet)
2: Thin steel sheet (base sheet)
3: Weld metal
4: Weld toe
5: Knocking pin
6: Knocking pin tip
7: Fold mark of a weld toe
8: Fold mark at a knocking mark edge
9: Weld ripple 5. A welded structure having a lap fillet welded joint, comprising a plurality of knocking mark groups in which a plurality knocking marks run at an angle relative to a welding direction across a weld toe of the lap fillet welded joint, wherein the knocking marks have a curvature radius in a cross section perpendicular to the weld line direction of 0.05 mm to 0.50 mm, and each knocking mark group is partially superimposed on an adjacent knocking mark group while, except for the superimposed part, an end part in a direction orthogonal to a welding direction of the knocking mark group is separated from an end part in the direction orthogonal to the welding direction of the adjacent knocking mark group.

6. The welded structure according to claim 5, wherein each knocking mark group has the knocking marks running at a slanting angle of 30° to 45° with respect to the welding direction.

7. The welded structure according to claim 6, wherein the lap fillet welded joint has a base sheet with a tensile strength of 780 MPa or more.

8. The welded structure according to claim 5, wherein the lap fillet welded joint has a base sheet with a tensile strength of 780 MPa or more.

9. A method of peening a lap fillet welded joint, comprising knocking a weld toe of the lap fillet welded joint using a knocking pin attached to a tip of a knocking tool, wherein the knocking pin has, on its tip, a curvature radius in a vertical cross section in a direction orthogonal to a welding direction of 0.05 mm to 0.50 mm and equal to or less than a curvature radius of the weld toe, the knocking pin is knocked while the knocking pin is oscillated in the direction orthogonal to the welding direction across the weld toe and moved in the welding direction, the knocking pin has an oscillation width around the weld toe at least twice a width of a knocking mark per knock point, and in a knocking region determined according to the oscillation width of the knocking pin, end parts in a direction orthogonal to the welding direction of knocking marks, which are located at a widthwise edge of the knocking region and partially superimposed on each other, are separated from each other in the direction orthogonal to the welding direction, or, knocking marks located at the widthwise edge of the knocking region are contacted with each other in the welding direction at three knock points or less.

10. The peening method according to claim 9, wherein the knocking tool is clamped with a viscoelastic material on a holder of the knocking tool.

11. A welded structure having a lap fillet welded joint, comprising a knocking region having a plurality of knocking marks running across a weld toe of the lap fillet welded joint, wherein in the knocking region, the knocking marks have a curvature radius in a cross section perpendicular to the weld line direction of 0.05 mm to 0.50 mm, the knocking marks have a total length on the weld toe of 50% or more of the whole length of the weld toe, and the knocking region has a width at least twice a width of a knocking mark per knock point, and further, in the knocking region, end parts in a direction orthogonal to the welding direction of knocking marks, which are located at an widthwise edge of the knocking region and partially superimposed on each other, are separated from each other in a direction orthogonal to the welding direction, or, knocking marks located at the widthwise edge of the knocking region are contacted with each other in the welding direction at three knock points or less.

12. The welded structure according to claim 11, wherein the lap fillet welded joint has a base sheet with a tensile strength of 780 MPa or more.

* * * * *